G. A. LEES.
COUNTER.
APPLICATION FILED JULY 17, 1911.
1,019,058.
Patented Mar. 5, 1912.
2 SHEETS—SHEET 2.
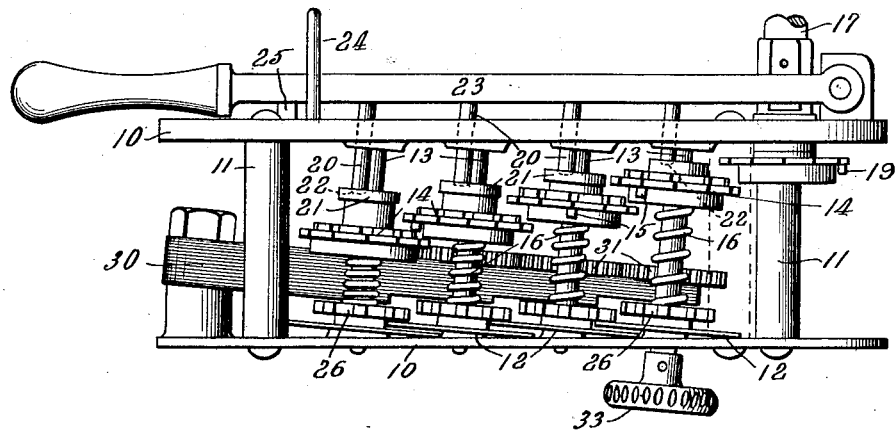
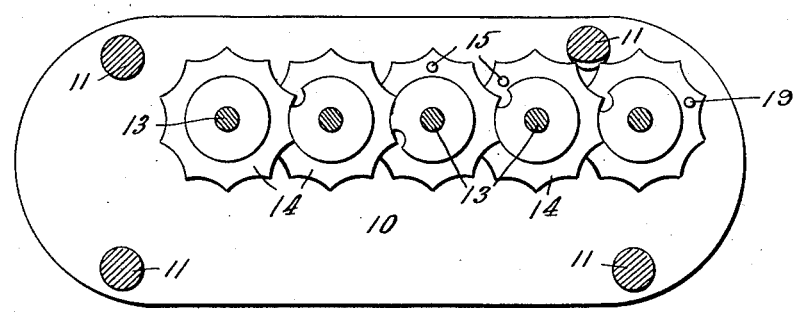
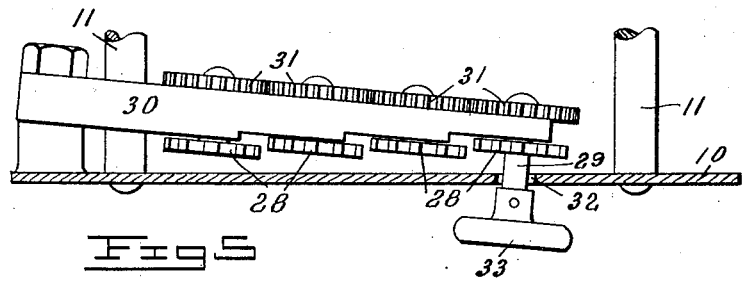
Witnesses
Inventor
George A. Lees
By
Attorneys

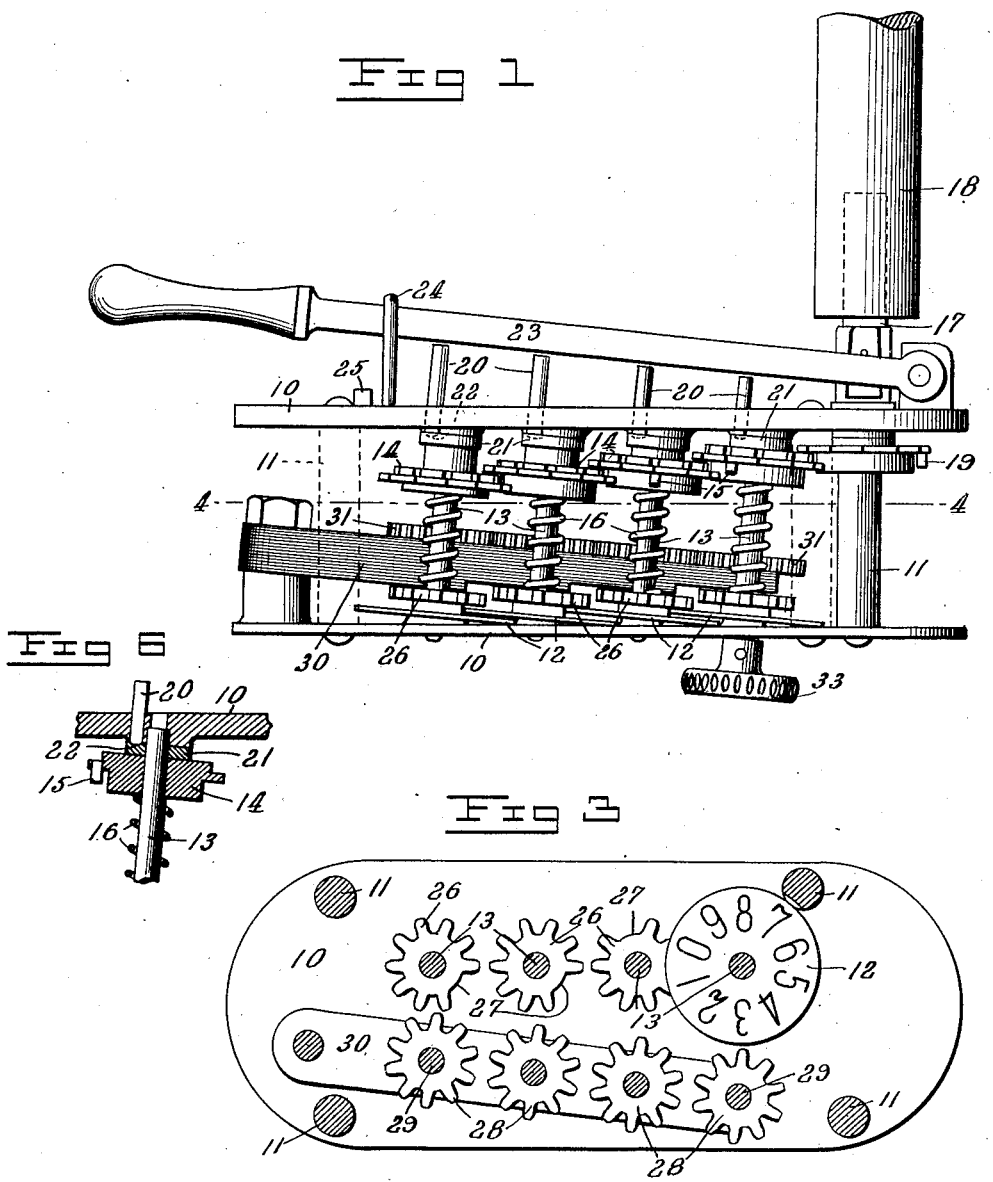

UNITED STATES PATENT OFFICE.

GEORGE ARTHUR LEES, OF NORTH ADAMS, MASSACHUSETTS.

COUNTER.

1,019,058.      Specification of Letters Patent.      Patented Mar. 5, 1912.

Application filed July 17, 1911. Serial No. 638,872.

*To all whom it may concern:*

Be it known that I, GEORGE A. LEES, a citizen of the United States, residing at North Adams, in the county of Berkshire and State of Massachusetts, have invented new and useful Improvements in Counters, of which the following is a specification.

The present invention relates to counters, and particularly to counters for cloth registering machines, although it will be obvious that the invention may be adapted to other uses, its use in connection with a cloth measuring machine being intended merely to illustrate one purpose.

It has for its object to provide counting and registering mechanism which will register forward and carry totals up to any predetermined figure; which will register backward so as to permit correction of errors in measurement if for any reason, such as over-running, the operator should lay off more than the desired number of yards; and which will provide an efficient and convenient re-setting mechanism, whereby, after the registering wheels and indicator dials have made their maximum or stated registration, the mechanism may be returned to zero point.

Briefly stated, the mechanism comprises registering dials and transfer wheels so arranged as that the units wheel, after completing its forward revolution, will transfer to the tens wheel and so on throughout the series, said transfer wheels being so connected with the indicator dials as that their revolutions will be properly indicated. The transfer wheels, furthermore, may be given a reverse or backward rotation and thereby impart a reverse rotation to the dials, carrying them back if they have overrun the desired or stated amount. Said transfer wheels are provided with uncoupling mechanism whereby the series may be disengaged so as to leave each transfer wheel and its corresponding indicator dial independently rotatable, in which condition they are engaged by novel re-setting mechanism, by means of which the indicator dials and transfer wheels may be returned to zero.

In order that the invention may be understood by those skilled in the art, I have illustrated in the accompanying drawings, which form a part of this case, the invention as I have embodied it and this embodiment is the best now known to me, although since the illustration is merely one physical embodiment of my invention and is not, in any sense, restrictive, I do not limit myself to the mechanical details shown and described, but regard as within the purview of my invention such obvious mechanical variations from the embodiment here shown as it will be apparent may be made.

Figure 1 is a view in plan of a counter with the case removed, showing my improvements. Fig. 2 is a view similar to Fig. 1, showing the mechanism in re-setting position. Fig. 3 is a view in section on a line just in rear of the registering dials to show the re-setting gears. Fig. 4 is a sectional view substantially on the line 4—4 of Fig. 1, showing the transfer wheels. Fig. 5 is a detail view of the resetting mechanism. Fig. 6 is a detail sectional view showing the transfer wheels and one of the thrust pins for disengaging the transfer wheels.

Referring to the drawings by numerals, I have shown herein a counter, the casing being omitted for clearness of illustration, said counter comprising side frames 10 having connecting posts 11, which side frames support the operating parts.

The counting elements proper comprise a series of indicator dials 12, four of these dials being shown, although it is obvious that the number may be increased or decreased, dependent on the needs of the work, said dials 12 being mounted on shafts 13, trunnioned in suitable bearings on the side frames 10, said shafts 13 being preferably arranged on an incline to the plane of the side frames 10 to provide for the overlapping of the indicator dials 12 to the end that a compact arrangement may be secured. The said shafts 13 carry transfer wheels preferably arranged as shown adjacent the opposite side frame 10, said transfer wheels 14 being provided with the transfer gears corresponding in number of teeth to the digits "0" to "9" appearing on the indicator dials 12 and having also step-up or transfer pins 15 to engage the gears on the succeeding transfer wheel of the series. The said transfer wheels 14 are slidably mounted on the shafts 13 but keyed thereto and normally held in the position shown in Fig. 1; that is, in operative engagement by springs 16 encircling the shafts. The said transfer wheels 14 are operated by means of a rotary stub shaft 17 which is secured in any suitable manner to the rotating part, the revolutions of which are to be registered, this rotating shaft or roller being conventionally illustrated at 18 in the accompanying drawings, and for the purpose of the present disclosure may be regarded as the measuring roller on a cloth machine. The said stub shaft 17 carries, at its inner end adjacent the units wheel of the series of transfer wheels, a disk having a "step-up" or transfer pin 19, which, as the measuring roller 18 revolves and drives the stub shaft 17, will advance the units transfer wheel and its indicator dial one digit for each revolution of the measuring roller and the stub shaft, the units wheel in the usual manner advancing the tens wheel for each revolution, and so on through the series.

It will be seen that backward rotation of the units wheel will impart a reverse movement to the other wheels of the series, so that if the machine has overrun and the register shows more than the desired amount of cloth or material being laid off, reversal of the machine will result in running the register back from the incorrect amount laid off to the stated amount, at which point the machine will, of course, stop. This provision for reversing and running back to the predetermined amount is of great importance, in that any error in the running of the material being measured may be conveniently and quickly corrected.

As has been stated, the transfer wheels 14 are slidably mounted upon the shafts 13 to which they are keyed, being normally held in operative relation by the springs 16. In order that the transfer wheels 14 may be thrown out of operative engagement with one another after the counter has reached its "total" or for any other reason it is desired to re-set to zero, I provide a series of throw-out pins 20, one for each transfer wheel, said pins being loosely mounted in the side plate 10 adjacent the transfer wheels 14. At their inner ends the throw-out pins 20 engage a collar 21 secured to the hub of each transfer wheel, each of said collars having a seat 22 which is engaged by the inner rounded end of the transfer pins 20. Owing to the off-set disposition of the transfer wheels 14 it is necessary that the transfer pins 20 be of gradually increasing length as shown best in Fig. 1, in order to give sufficient movement to the transfer wheels 14 to insure their disengagement, and these transfer pins 20 are preferably arranged, as shown, at the same inclination and therefore parallel with the shafts 13 on which the transfer wheels and indicator dials are mounted. Adjacent the outer protruding ends of the transfer pins 20 I arrange a pin-operating lever 23 pivoted to a suitable bracket on the side plate 10, the said lever 23 being preferably forked and embracing the journal or bearing for the stub shaft 17, thus giving a compact and convenient arrangement, as well as providing for the proper leverage with respect to the transfer pins 20. The said pin-operating lever 23 is provided with a handle by which it may be conveniently swung and a keeper 24 is provided to maintain it in its proper relation to the transfer pins, the present construction showing also a stop 25 against which the said lever 23 strikes when it has been thrown forward to actuate the transfer pins. With this construction it will be obvious that on throwing the lever 23 from the inclined position shown in Fig. 1 to a position parallel with the side plate 10, as shown in Fig. 2, the transfer pins 20 will be thrust forward, impinging against the hubs of the transfer wheels 14 and throwing the series of transfer wheels out of operative engagement. It will be observed that the transfer pins 20 have a slight play between the transfer lever 23 and the hubs of the transfer wheels, this for the reason that as the transfer wheels 14 revolve, starting from their initial position, a slight outward movement of the transfer pins 20 occurs as they are lifted out of their seats 22 in the hubs of the transfer wheels.

When the lever has been thrown, as just described to unmesh or disengage the transfer wheels 14, it is obvious that any one of them may be freely and independently rotated without affecting any other wheel of the series. In order that the series may be independently and simultaneously rotated to return them to zero position, I provide the shafts 13 adjacent the indictor dials 12 with resetting gears 26, each of which has a mutilated portion 27 at one point of its periphery, these resetting gears 26 being arranged so that they are engaged by similar gears 28 mounted on short stub shafts 29 carried by a pivoted bar 30 lying just below the shafts 13 and the resetting gears 26. The said resetting gears are arranged in staggered relation so as to accommodate the staggered relation of the gears 26 by forming stepped seats on the bar 30, as shown in Fig. 2. The gears 28 are coupled for simultaneous rotation by means of crown gear wheels 31 carried at the other end of the stub shafts 29, one of the stub shafts 29—the end one in the present embodiment—extending through a slot 32 in the side plate 10 and having fixed to its projecting end a nut or handle 33, by which it and through the train of gearing described the entire series of resetting gears carried by the bar may be rotated. The bar 30 normally lies in its lower inclined position, the stub shaft at the end of the series playing freely through the slot 32, so that the resetting gears carried by the bar are normally out of mesh with the resetting gears 26 on the shafts 13. When, however, it is desired to throw the resetting mechanism in mesh, the bar will be lifted by means of a nut or handle 33, engaging the gears 26 and 28, and then by rotating the gears 28 through the medium of the handle or nut 33, the gears 26 and the indicator dials 12 will be returned to zero position. It will be observed that the mutilation 27 on the gears 26 is diametrically opposite the zero indication on the dials 12, so that whatever the position of the gears 26 when the resetting bar 30 is raised and the operating gears are rotated they will cease to be effective on the resetting gears 26 immediately the zero mark on the dials 12 comes opposite the sight openings in the side plate 10, the resetting gears 28 rotating idly in the mutilated portion 27 of the gears 26. With this construction it will be seen that a very convenient resetting mechanism is provided and one which is adaptable very readily to a common form of counter without reconstructing the same to any great extent or enlarging its proportions.

In use, the operation of the parts is very simple, requiring but two movements, namely, the throwing of the lever which disengages the transfer wheels, and the lifting of the operating train which resets the dial. After resetting the parts are simply released and the lever is automatically thrown to its normal position under the return movement of the transfer wheels which are thrust to engaging position by the springs 16 on the shafts 13, while the bar 30 drops by gravity to its normal disengaged position.

I claim:—

1. A device of the character described comprising a plurality of transfer wheels normally interconnected, means controllable at will for disconnecting said transfer wheels from each other, a plurality of mutilated gears for turning said transfer wheels to normal position, a plurality of gears separate from each other for meshing with said mutilated gears in order to actuate the same, a train of gears intermeshing with each other and operatively connected with said separate gears for turning the latter, and means for shifting said separate gears bodily toward and from said mutilated gears.

2. A device of the character described comprising a plurality of transfer wheels normally interconnected, means controllable at will for disconnecting said transfer wheels from each other, a plurality of mutilated gears for turning said transfer wheels to normal position, a pivotally mounted bar disposed adjacent to said mutilated gears and adapted to swing, a plurality of gears disconnected from each other and revolubly mounted upon said bar, said last mentioned gears being in the same plane as said mutilated gears and adapted to mesh therewith and unmesh therefrom, a train of gears operatively connected with said gears disconnected from each other for the purpose of turning the same, said train of gears being carried by said bar as the latter is swung upon its pivot.

3. A device of the character described comprising a plurality of shafts, a plurality of transfer wheels carried by said shafts and normally interconnected, a plurality of separate push pins one for each transfer wheel for displacing said transfer wheels to different distances upon said shafts in order to disconnect said transfer wheels from each other, and a single lever disconnected from said push pins and movable relatively to said shafts for the purpose of actuating said push pins in unison.

In testimony whereof I have hereunto set my hand in presence of two subscribing witnesses.

GEORGE ARTHUR LEES.

Witnesses:
 HUGH P. DRYSDALE,
 JAMES P. DRYSDALE.

Copies of this patent may be obtained for five cents each, by addressing the "Commissioner of Patents. Washington, D. C."